LSI ARRAY AND STANDARD CELLS

Original Filed June 23, 1967 4 Sheets-Sheet 1

LSI ARRAY AND STANDARD CELLS

Original Filed June 23, 1967 4 Sheets-Sheet 3

United States Patent Office

Re. 27,935
Reissued Mar. 5, 1974

27,935

LSI ARRAY AND STANDARD CELLS

Thomas Richard Mayhew, Langhorne, Pa., assignor to RCA Corporation

Original No. 3,365,707, dated Jan. 23, 1968, Ser. No. 648,449, June 23, 1967. Application for reissue Jan. 10, 1972, Ser. No. 216,530
Int. Cl. G11c *11/40*
U.S. Cl. 340—173 R 12 Claims

Matter enclosed in heavy brackets [ ] appears in the original patent but forms no part of this reissue specification; matter printed in italics indicates the additions made by reissue.

ABSTRACT OF THE DISCLOSURE

A large scale integrated (LSI) array of standard cells and interconnection scheme is described. The standard cell includes four insulated gate field-effect devices having both committed and uncommitted connecting points. The system designer is given the flexibility of specifying the functional identity of a cell, a group of cells, parts of a cell and various combinations thereof by means of the design connection pattern of the various uncommitted connecting points.

Cross references

A patent application, Ser. No. 637,413, entitled, Digital Logic Apparatus, filed on May 10, 1967, by Joseph E. Annis and assigned to the present assignee describes EXCLUSIVE OR/EXCLUSIVE OR field-effect circuits which may be implemented in the LSI array of the present invention. Another patent application, Ser. No. 610,-439, entitled, Signal Translating System, filed on Jan. 19, 1967, by Joseph R. Burns and assigned to the present assignee describes a linear amplifier which may also be implemented in the LSI array of the present invention.

Background of invention

The implementation of electronic apparatus at the system and/or subsystem level is undergoing radical change with the advent of large scale integration (LSI) technology in terms of performance, reliability and design practices. As used herein, LSI technology refers to the manufacturing capability of fabricating more and more circuit components in or on the same chip or substrate whereby the electronic functional complexity on the chip approaches the system or subsystem level as distinguished from more elemental functional units such as logic gates, amplifiers, and the like.

The application of LSI technology to digital systems, such as electronic computers promises to improve operating speed performance. Approximately 99% of the space in even densely-packaged computers represents packaging and circuit interconnections. This separation between computer components results in a severe speed problem. Large scale integration of circuit components on a single substrate offers promise of alleviating this speed problem.

Electrical signals must cross a multiplicity of interfaces between computer elements, for example, bonded interconnections, soldered or welded connections, wire-wrap connections, and plug-card connections. Due to the human factor involved in the manufacture of these connections, reliability is limited. The LSI technology offers batch fabrication of interconnections, thereby improving reliability.

The customary digital system design dichotomy of circuit or functional building block designers interfaced with system designers is being modified by LSI technology which introduces another interface—that of the batch fabricating manufacturer with both the building block and the system designers. The aim for an LSI computer equipment is to employ as few LSI packages as possible which are all preferably of the same type in order to minimize cost as well as differing parts. In achieving this aim, it is necessary to pack as much functional capability as practical into an LSI package. This requires an efficient utilization of LSI package space or areas as to both component layout as well as interconnection thereof at the system level. Efficient usage of area and thus optimum functional capability of the LSI package can only be achieved by the joint cooperative working effort of the batch fabricating manufacturer, the building block designer and the system designer.

The most efficient use of LSI package area is achieved by the custom approach to LSI whereby each functional or system design is customized both as to component location and as to metalization interconnects. However, the custom approach requires the design and implementation of a new set of fabricating masks for each new functional or system design. At the present time the cost of a new set of fabricating masks for each new chip design is prohibitive for low volume orders and is justified only for high volume orders.

Another approach to LSI is the master slice approach which distributes the cost of fabricating masks among different functional or system designs except for the mask or masks involved in metalization (the final fabricating step). In other words, for a given chip component layout, the same master slice fabricating masks, such as diffusion and insulation masks, are used for every functional design, but different metalization masks are required for each new or different design. Thus, the component layout is fixed and only the metalization pattern is customized for each new application. The success of a master slice LSI array component layout depends upon whether an adequate number of different applications of sufficient functional complexity can be designed with a fixed component layout in order to satisfy the economics of distributed fabricating costs. Accordingly, it is important to provide a component layout which affords not only an efficient use of chip or substrate area but also a sufficient degree of design flexibility in order to assure an adequate number of different applications of sufficient functional complexity.

The master slice LSI approach generally involves the organization of the circuit components into an array of substantially identical component cells (standard cells) or building blocks which may have a fixed or variable functional identity. A fixed identity cell for example, may be a NOR gate whereby each new application is generated from interconnections of the gates in the array. This fixed identity cell array is unsatisfactory because it is limited in design flexibility as well as inefficient in utilization of substrate area. The design flexibility is limited since only NOR gates can be used to implement the system functions. The fixed identity cell array also is inefficient because in many applications not all of the inputs to a logic gate are used whereby the area occupied by unused NOR gate input component is wasted. In addition, the fixed identity cell array is inefficient in forming certain functions, each as triggerable flip-flops.

The variable identity cell, on the other hand, affords the system or application designer the flexibility of specifying the functional identity of a cell, a group of cells, parts of a cell and various combinations thereof such that the functional complexity of the chip is greatly enhanced. However, it is extremely important to provide a standard cell which is not only efficient in terms of substrate area usage but is suitable for implementing enough different applications of sufficient functional complexity in order to justify the costs.

Brief summary of invention

According to one aspect of the invention, an LSI array of standard cells sharing a common substrate is provided wherein each standard cell includes four insulated gate field-effect devices. Two of the devices have relatively large transconductances (gm's) and are suitable for use as inverter devices in digital systems. A third one of the devices is a relatively small (gm) device suitable for use as a load for the inverter devices. The fourth device is an intermediate (gm) device suitable for use as a transmission or coupling device in both dynamic and static logic applications. The channels of the two inverter devices share a first common committed connection; while the channels of the load devices and transmission device share a second common committed connection. A plurality of non-committed connection points are provided for the gates and the remaining source and drain regions of the four insulated gate field-effect devices.

In a preferred embodiment of the invention, the common substrate is of a first conductivity type semiconductor material and a pattern of diffused regions of second conductivity type material is diffused on one surface of the substrate to form the source and drain regions of the insulated gate field-effect devices. The first committed functional connection is provided by a common source region of second conductivity material which is shaded by the two inverter devices. Similarly, the second committed functional connection is provided by a common diffused region of second conductivity type material shared by the third and fourth devices. A layer of insulation overlies the substrate surface and has access apertures therethrough positioned over portions of the various diffused regions to form the non-committed connection points. A functional interconnect pattern of metalization is positioned over the insulating layer and extends through the access apertures to functionally interconnect the array cells.

In the array, the cells are arranged in a coordinate matrix of substantially aligned rows and columns. Adjacent rows are spaced apart to provide runway areas therebetween. Extending under each runway are diffused regions of second conductivity type material for the purpose of implementing the crossing of connectors. According to one feature of the invention, adjacent cells in a column which are separated by a runway share a plurality of common diffused regions of second conductivity material which extend under the runway. Access apertures are positioned over these shared diffused regions. Supply lines such as ground, the power supply and clock signal lines overlie the runway and make contact through the access apertures with appropriate ones of shared diffused regions.

According to a further feature of the invention, dynamic or multi-phased clocked logic systems employ an interconnect pattern which enables operation at relatively low clock frequencies. The interconnect pattern includes a metalization connection between the outputs of stages which are clocked at a first phase and the inputs of stages which are clocked at a second phase; while the outputs of the second stages are connected to the outputs of the first stages by way of diffused region interconnections.

In still another feature of the invention, a serpentine or S-shaped bus structure is utilized with the standard cell matrix, whereby metallized interconnects can be used between a large number of cells.

Brief description of drawings

In the drawings, like reference characters denote like components, and

Detailed description

The present invention may be practiced with any desired conductivity type insulated gate field-effect devices which share a common substrate of a suitable material such as glass, sapphire, semiconductor material, and the like. However, by way of example and completeness of the description, the invention is illustrated with insulated gate field-effect devices of the metal oxide semiconductor (MOS) variety of p-type conductivity (P-MOS). It is noted at this point that the semiconductor material can be any suitable material which is generally employed to make insulated gate field-effect devices in the semiconductor art. For the purpose of the description which follows, all semiconductor materials will be assumed to be silicon unless otherwise specified.

The standard cell building block

Figure 1:
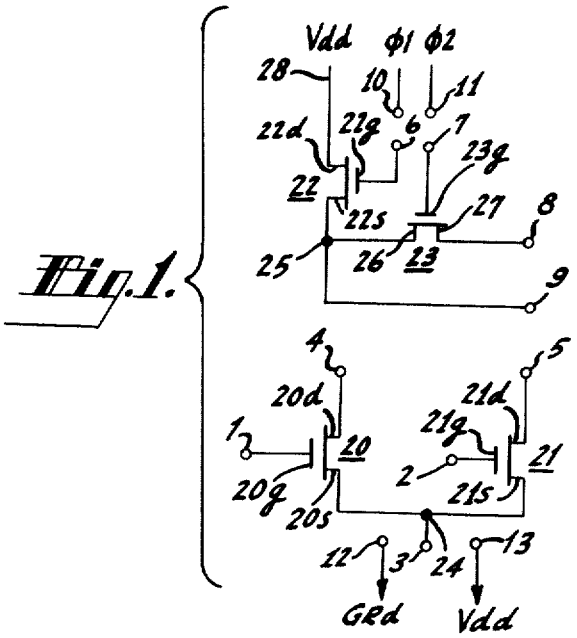
FIG. 1 is a schematic diagram of the standard cell of the present invention illustrated with conventional electrical circuit symbols.

The standard or unit cell 50 of the invention is illustrated in FIG. 1 with conventional electrical circuit symbols in a schematic diagram. The standard cell 50 includes a pair of P-MOS devices 20 and 21 which are relatively large transconductance (gm) devices suitable for use as inverter devices. The standard cell 50 further includes a third P-MOS device 22 which has a relatively small gm. The P-MOS 22 device may be used as a load for the inverter devices 20 and 21. The other P-MOS device 23 is an intermediate gm device and may be used as a transmission or coupling device in either dynamic or static logic applications.

Each of the P-MOS devices has a channel or conduction path which is bounded at the ends thereof by source and drain regions which are designed for the devices 20, 21 and 22 by means of the alphabetic character s or d following the numerical reference character for the associated P-MOS device. For example, the P-MOS device 22 has source and drain regions 20s and 20d, respectively. These source and drain designations are assigned on the basis of normal usage of the devices 20, 21 and 22. However, it should be noted that the source and drain designations are interchangeable depending on whether the device is operating as a source-follower or as a common source device. Since the P-MOS device 23 is normally used as a transmission gate, the source and drain regions are merely idenfied by the reference characters 26 and 27 in FIG. 1. In addition, each of the P-MOS devices has a gate region which overlies the associated channel and is insulated therefrom by a relatively thin layer of insulation. For each of the P-MOS devices, the gate regionis identified by the reference character g following the associated numercial reference character. For example, the gate region of the P-MOS device 20 is designated as 20g.

The standard cell 50 includes a pair of unconditional or committed functional contact points 24 and 25. The committed contact point 24 represents an unconditional functional connection of the source regions 20s and 21s. The committed contact 25 represents an unconditional electrical connection of the source region 22s and the source-drain region 26 of the P-MOS device 23.

A plurality of uncommitted or conditional contact points 1 through 13 are also provided for the standard cell 50. The uncommitted points 3 and 9 are associated with the committed contact points 24 and 25, respectively. The uncommitted contact points 4 and 5 are associated with the drain region 20d and 21d, respectively. The uncommitted point 8 is associated with the source-drain region 27 of the P-MOS device 23. The uncommitted contact points 1, 2, 6 and 7 are associated with the gate regions 20g, 21g and 23g, respectively. The remaining uncommitted contact points 10, 11, 12 and 13 are shown to provide access for the cell 50 to various supply lines. For example, the points 12 and 13 provide access to circuit ground Grd and the power supply Vdd, respectively; while the points 10 and 11 provide access to a pair of clock lines $\phi 1$ and $\phi 2$, respectively.

A further committed or unconditional functional connection designated 28 couples the drain region 22d to that supply line which is designated Vdd.

Figure 2:
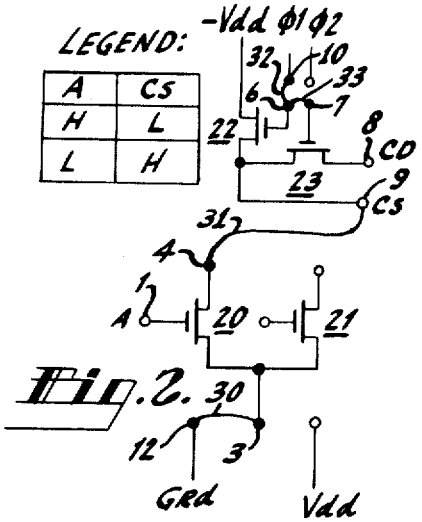
FIG. 2 is a schematic circuit diagram showing the standard cell of FIG. 1 connected as an inverter.
Figure 4:
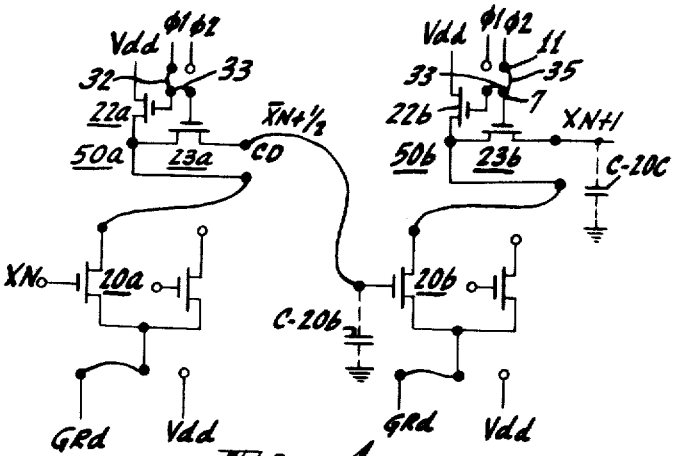
FIG. 4 is a schematic diagram showing one bit of delay of a dynamic shift register.
Figure 3:
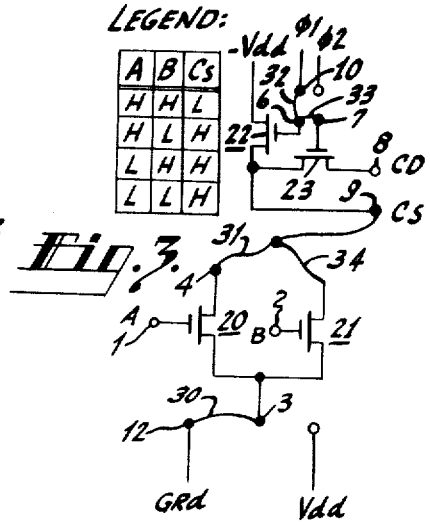
FIG. 3 is a schematic circuit diagram showing the standard cell of FIG. 1 connected as a two-input logic gate.

The standard cell 50 is suitable for use as a variable identity building block in a LSI array to implement desired digital systems, such as adders, shift registers, counters, and other logical switching systems. When implementing a desired system, the designer gives functional identity to the standard cell, a group of standard cells, parts of standard cells or any combination thereof by specifying the electrical or functional connections of the uncommitted contact points 1 through 13. Some examples of functional identities which can be imparted to the standard cell or cells or parts thereof are illustrated in FIGS. 2, 3 and 4. In these examples, the supply voltage is designated—Vdd for the P-MOS circuits.

In FIG. 2, the standard cell may be given the identity of an inverter by using the inverter device 20 in combination with the load device 22. This is illustrated in FIG. 2 for static logic applications by the connector 30 coupling the uncommitted contact points 3 and 12 together, the connector 31 connecting the points 4 and 9 together, and the connector 32 coupling the points 6 and 10 together. Thus, with a signal A applied to the contact point 1 and an output signal Cs being obtained from either of the contact points 4 or 9, the accompanying legend in FIG. 2 is descriptive of the circuit operation. According to the legend when the input signal A is at a high (H) level, the output Cs is at a low (L) level. For example, the L level could be—Vdd and the H level could be Grd. On the other hand, when the input signal A is low (L), the output signal Cs is high (H). For static logic applications, the $\phi 1$ line is returned to a steady D.C. voltage, for example either the —Vdd line or some other suitable negative voltage. The P-MOS devices 21 and 23 which are unused may be used in combination with other standard cells in the array environment to form other functional elements.

For dynamic logic applications, a further connector 33 couples the contact points 6 and 7 together. The $\phi 1$ clock line is now supplied with a clock signal instead of a steady D.C. voltage and the output can be taken either from the contact point 8 or 9 depending on whether the device 23 is used. The accompanying legend is still descriptive of the inverter operation.

Another exemplary functional identity for the standard cell is given in FIG. 3, where a two-input logic gate is formed from the standard cell. As in FIG. 2, the connectors 32 and 33 are used to interconnect the load and transmission devices 22 and 23. The connector 31 now includes an additional or subsidiary connector 34 for also connecting the contact point 5 to the contact point 9. Again, the connector 30 couples the contact points 3 and 12 together. Again for static logic applications, the $\phi 1$ line is connected to a steady D.C. voltage which may be either Vdd or some other suitable voltage. The input signals A and B are applied to the contact points 1 and 2 and the static output Cs is obtained from the contact point 9. The accompanying legend for FIG. 3 is descriptive of the circuit operation. Thus when either of the input signals A or B is low (L), the output signal Cs is high (H). On the other hand, when both input signal A and B are high (H), the output signal Cs is low (L). If the binary symbols 1 and 0 are assigned to the H and L levels, respectively, the logic circuit can be said to function as a NAND gate. On the other hand, if the binary symbols 1 and 0 are assigned to the L and H levels, respectively, the logic circuit functions or a NOR gate.

It should be noted at this point that the noncommitted points 6 and 7 may be connected both to either the $\phi 1$ or the $\phi 2$ line or separately to the $\phi 1$ and $\phi 2$ lines. Moreover, the connector 33 is unnecessary when it is not desired to use the device 23 as may be the case in most static and in some dynamic logic applications. For a typical dynamic logic application where the device 23 is used, either the output signal Cd or the output signal Cs may be used.

The implementation or dynamic logic with the standard cell utilizes multi-phase clocking on the load devices and the transmission devices to direct the flow of information while taking advantage of the gate capacitances of a following P-MOS device for temporary storage as described later. It is in dynamic logic that the MOS devices often are used to best advantage. The circuits are simple because of the high input impedance characteristics of the MOS device. Moreover, power is consumed only when the clock is on so that less power is dissipated than for similar static logic application.

The bilateral current flow properties of the MOS devices, specifically the transmission gate device 23, allow the gate capacitance of the subsequent logic function to be either charged or discharged. By using two inverters, two coupling devices and two clocks, a one "bit" delay stage of a dynamic shift register can be implemented. One bit stage of a dynamic shift register is illustrated in FIG. 4 with a pair of standard cells 50a and 50b. The standard cells 50a is connected as an inverter in the same manner as the inverter of FIG. 2. Similarly, the standard cell 50b is connected as an inverter in a similar manner except that the connector 32 is omitted and a connector 35 connects the contact points 7 and 11 together. This enables the inverter of cell 50a to be clocked on clock phase $\phi 1$ and the inverter of cell 50b to be clocked on clock phase $\phi 2$. The gate capacitance C–20b represents the gate capacitance of the P-MOS device 20b in cell 50b; while the capacitance C–20c represents the gate capacitance of the next succeeding stage (not shown). The output terminal Cd of cell 50a is connected to the input terminal 1 of cell 50b.

Figure 5:
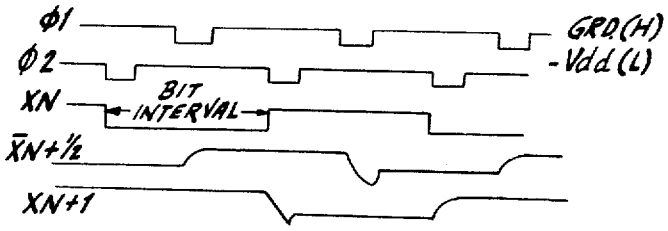
FIG. 5 is a timing diagram for the shift register of FIG. 4.

The timing diagram for the dynamic shift register is shown in FIG. 5. It should be noted that the clock phases are never at the L level (—Vdd) at the same time in order to insure proper flow of information. It should also be noted that the capacitance memory time constant must be greater than the time interval between the trailing edges of $\phi 1$ and $\phi 2$ or vice versa, which ever is greatest. The small steps in the waveforms $\overline{X}n+\frac{1}{2}$ and $Xn+1$ are caused by capacitive coupling feed-through in the transmission gate devices 23a and 23b when the clock pulse returns to the H level.

The operation is as follows. The clock signal $\phi 1$ changes to the L level and turns devices 22a and 23a on. The gate capacitance C–20b is charged to the H level (Grd) by way of the devices 23a and 20a if Xn is at the L level, or is dicharged to the L level by way of the devices 22a and 23a if Xn is at the H level. The clock signal $\phi 1$ returns to the H level and turns the P-MOS devices 22a and 23a off. The information remains stored on the capacitance C–20b.

The clock signal $\phi 2$ changes to the L level and turns the devices 22b and 23b on. The inverse of the information stored on the gate capacitance C–20b is transferred to the gate capacitance C–20c by way of the transmission device 23b. The clock signal $\phi 2$ returns to the H level and turns the devices 22b and 23b off. The information stored on the capacitance C–20c will be transferred when the clock signal $\phi 1$ changes to the L level again. Thus during a full cycle of a $\phi 1$ clock pulse followed by a $\phi 2$ clock pulse, the information Xn is propagated with a delay of one-bit time from the input of the device 20a of cell 50a to the gate capacitance C–20c of the next succeeding stage.

The functional identities illustrated in FIGS. 2 through 5 for the standard cell are by way of example only and other functional identities may be assigned the cells. For instance, the aforementioned copending application of Joseph E. Annis describes EXCLUSIVE OR and $\overline{\text{EXCLUSIVE OR}}$ circuits which may be implemented with the standard cell. Other circuits include, inter alia, R-S flip-flops and triggerable flip-flops. In addition to the aforementioned digital circuits, the standard cell can also be used to implement the linear amplifier described in the aforementioned copending application of Joseph R. Burns.

The standard cell LSI array environment

Figure 6:
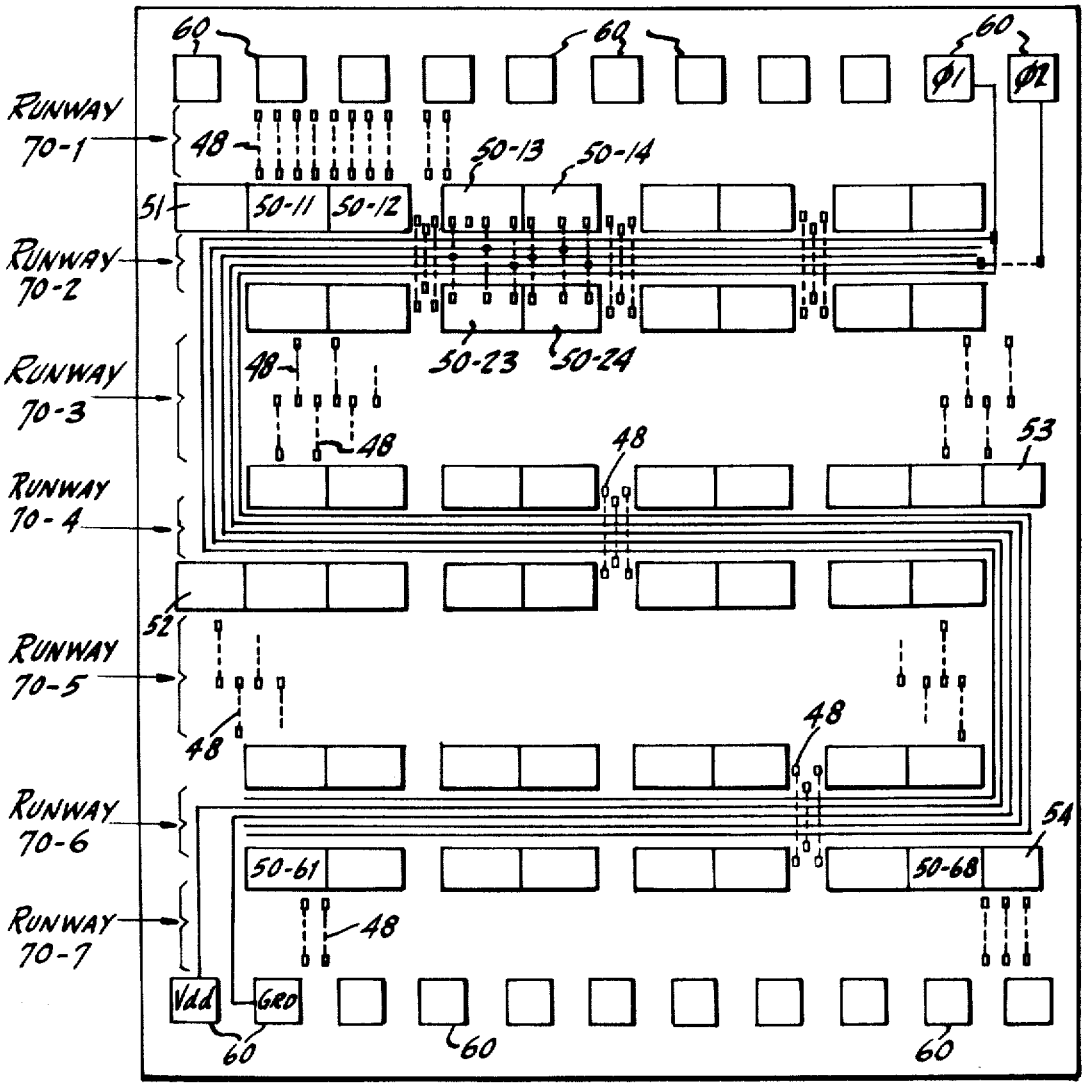
FIG. 6 is a block diagram of the LSI array interconnect pattern of the invention.
Figure 7:
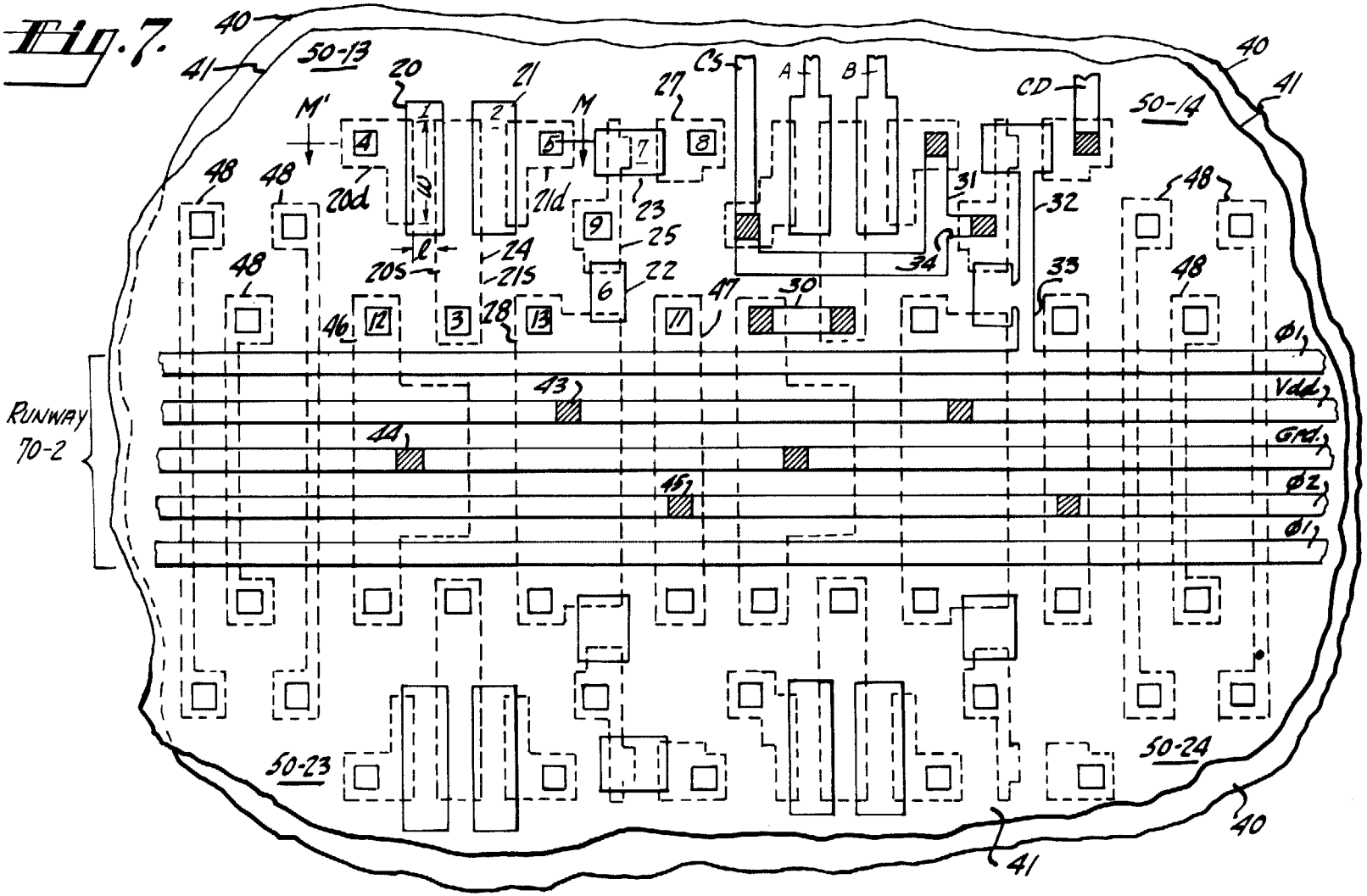
FIG. 7 is a top view of four cells of the LSI array of FIG. 6 illustrating the standard cell of the present invention.
Figure 8:
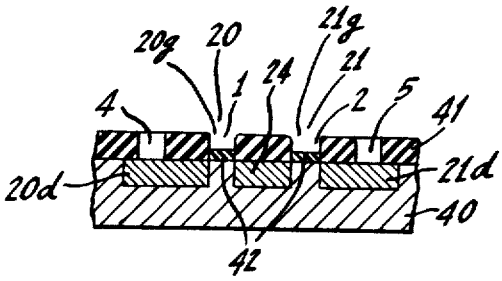
FIG. 8 is a sectional view taken along the line M–M' of FIG. 7.

The LSI array environment for the standard cell is shown in FIGS. 6, 7 and 8. FIG. 8 is a composite of four of the standard cells of FIG. 6 and is utilized to illustrate the P-MOS structure as well as the metalization pattern for the two-input logic gate of FIG. 3. Referring initially to FIG. 6 for a brief description of the LSI array, the standard cells are arranged in coordinate rows and columns. Each of the standard cells is desiganted by the numeral 50 as a first part of the reference character. The second part of the reference character is employed to designate the array location of a particular cell. The first location numeral refers to the row location; while the second location numeral refers to the column location. For instance, the standard cell located in the bottom-most row and left-most column is identified as 50–61, where the numeral 6 refers to the sixth row and the numeral 1 refers to the left-most column.

In a cell layout there may be space or spaces left-over which is or are too small for a standard cell 50. Accordingly, these left-over spaces may be filled by special cells and in FIG. 6 the LSI array is shown to include other cells, such as cells 51, 52, 53 and 54. For example, these cells may include two inverter devices and a load device arranged for interconnection as a two-input logic gate.

Located above the first or top cell row is a runway 70–1. Additional runways 70–2 through70–7 are also located between the various rows and below the last or bottom Additional runways 70–2 through 70–7 are also located metalization pattern of supply lines which wind through the coordinate array in a serpentine or S-shaped manner so as to be common to each of the cells. The supply lines include a Vdd line, a Grd line, a clock $\phi 2$ line and a pair of clock $\phi 1$ lines. The clock $\phi 1$ lines are each positioned adjacent a different cell row for reasons which are specifically pointed out later on in the description of FIG. 7. The runways 70–1, 70–3, 70–5 and 70–7 are for the general purpose of providing space for interconnections of the standard cells 50.

Located in a row across the top of the standard cell array and in a row across the bottom of the array is a plurality of bonding regions 60 used for interface connection between the LSI array and other devices. Although the bonding regions 60 may be either diffused or metal lands, they are preferably of metallic material for the P-MOS array. Some of the bonding regions 60 may be used for input/output connections to the array; while others are used to provide the various supply and control voltages to the array. To this end, the clock $\phi 1$ lines are each connected to the bonding pad designated $\phi 1$; while the clock $\phi 2$ line is connected to the bonding pad designated $\phi 2$. Similarly, the Vdd line and the Grd line are connected to the bonding pads designated Vdd and Grd, respectively.

Extending under each of the runways is a plurality of spaced apart diffused regions. As described in detail hereinafter, some of these regions located under the runways 70–2, 70–4 and 70–6 provide a dual function of forming a source or drain region in a cell as well as a diffused connector function to the supply bus structure. Others of the diffused connectors, designated 48, extend under the various runways in spaced patterns to accommodate the crossing of connectors. The access apertures to the various diffused regions are spaced apart whereby overlying metal connectors can run therebetween in desired patterns.

The serpentine or S-shaped bus structure for the LSI array is an important feature of the invention in that it permits metal interconnects between the cells of any one row and several of the other rows, thereby avoiding the higher resistance and capacitance of the diffused region connectors. For example, the cells in the first row can be interconnected with the cells of the fourth and fifth rows with only metal connectors; while the cells of the second row can be interconnected with the cells of the third and sixth rows with only metal connectors.

Referring now to the FIGS. 7 and 8 for a more detailed description of both the standard cell P-MOS structure as well as the array structure, there is shown (FIG. 7) a top view of a four-cell composite corresponding to the cells 50–13, 50–14, 50–23 and 50–24 of the LSI array of FIG. 6. The cell 50–13, which has reference characters corresponding to the standard cell circuit schematic of FIG. 1, will now be described with reference to the FIG. 7 sectional view along the line M–M' in FIG. 6.

The P-MOS standard cell 50–13 as well as the entire LSI array is supported by an N-type semiconductor substrate 40, best seen in FIG. 8. A plurality of spaced apart P-regions are diffused in one surface of the substrate 40 to form the P-MOS devices as well as P-region (P-tunnel) connectors. For instance, in FIG. 8, the diffused P-regions designated 20d and 21d form the drain regions of the P-MOS devices 20 and 21; while the P-region designated 24 forms a common source region for the P-MOS devices 20 and 21 as well as providing an unconditional or committed electrical connection thereof. The space between the P-regions 20d and 24 and the space between the P-regions 21d and 24 are defined as the channels or conduction paths of the P-MOS devices 20 and 21.

A relatively thick (for example 15,000 angstroms) insulating layer 41, such as silicon dioxide, overlies the diffused region surface of the substrate 40. Extending through the oxide layer 41 is a plurality of access apertures or holes which expose the device channels as well as a portion or portions of the various diffused P-regions. For the case of the standard cell 50–13, these access apertures represent the uncommitted or conditional connecting points previously identified in FIG. 1. Accordingly, they bear like reference characters. For the P–MOS devices 20 and 21, the access apertures 4 and 5 are positioned over the drain regions 20d and 21d, respectively, to expose a portion of each region. The access apertures designated 1 and 2 are positioned over the channels of the two devices. Positioned within the apertures 1 and 2 and overlying the substrate 40 are relatively thin (for example, 1,000 angstroms) layers 42 of oxide to form the gate regions 20g and 21g.

The other P–MOS devices 22 and 23 are similarly formed in the N-type substrate 40. These two devices share a common P-region 25 which corresponds to the unconditional or committed electrical connection previously described in FIG. 1.

In the LSI array environment for the standard cell, the effective mobility $\mu$ of the carriers, the permittivity $\epsilon$ of the gate translator and the thickness T of the gate insulator are the same for all P–MOS structures whereby the gm of each P–MOS is proportional to the width w divided by the length (w/l) of its respective channel. In FIG. 7 these dimensions l and w, which are similiarly defined for each P–MOS structure, are designated by way of example for the channel of the P–MOS structure 20. As there illustrated, the length l is the spacing between the drain and source P-regions 20d and 24; while the width w is the dimension transverse to the length. These channel dimensions w and l and therefore the gm of each P–MOS structure are determined by the P-region diffusion mask during the fabrication process. Thus, the gm's of inverter P–MOS structures 20 and 21 are made large by making w large and l small; whereas the gm of the load P–MOS structure 22 is made small by making its channel dimensions l and w relatively larger and smaller, respectively.

The runway 70–2 located between the first row cells 50–13 and 50–14 and the second row cells 50–23 and 50–24 provides access to each of the cells from the various supply lines or conductors $\phi$1, $\phi$2, Vdd, and Grd which overlie the thick oxide 41 and extend along the runway. These conductors according to P–MOS technology are generally formed of metal for example, aluminum. The supply lines Vdd, Grd and $\phi$2 are brought into each cell by way of contact through access apertures to underlying diffused P-regions, thereby providing crossover interconnects. Thus, the Vdd line makes contact with the P-region 28 by way of access aperture 43; the Grd line makes contact with the P-region 46 by way of access aperture 44; and the $\phi$2 line makes contact with the P-region 47 by way of access aperture 45. In the drawing, the access apertures 43, 44 and 45 are darkened to show an electrical connection. The P-regions 28, 46 and 47 extend under the runway 70–2 and are common to the standard cells 50–13 and 50–23. Thus, the P–MOS device 22 in each of the cells shares the common P-region 28.

Each cell has access to the $\phi$1 supply line since there is a $\phi$1 supply line located adjacent each cell. That is, the top-most $\phi$1 line in FIG. 6 is located adjacent the first row cells; while the bottom-most $\phi$1 line is located adjacent the second row cells. Consequently, the $\phi$1 lines can be connected by appropriate metalization to the desired access aperture of any cell without the use of diffused P-regions.

The further P-regions 48, extend under the runway 70–2 to provide a means for crossing under the supply lines to interconnect the first row cells with the second row cells and to form functional systems. As can be seen in FIG. 6, these additional P-regions 48 are positioned at various locations along the runways 70–2, 70–4 and 70–6 as well as in spaced patterns along the runways 70–1, 70–3, 70–5 and 70–7.

The first row cell 50–14 in FIG. 7 is illustrated with an exemplary metalization pattern for the two-input logic gate of FIG. 3. The solid line metal connectors bear the same reference characters as in FIG. 2 such that any further description thereof is unnecessary.

The LSI array or chip may be constructed in accordance with any suitable process. A typical process employs only four fabricating masks. The first mask is utilized to diffuse the P-regions into the N-type substrate. A relatively thick layer of oxide is then placed on the substrate surface containing the diffused P-regions. The second mask is then employed to form the apertures which expose the P-regions and the gate regions by etching away the oxide. A thin oxide is then placed over the chip. The third mask is utilized to etch away the thin oxide in the P-region access apertures. Finally, the fourth mask is employed to provide the gate, source and drain metals as well as the metalization interconnections of the P–MOS structures and crossover P-regions. It should be noted that the metalization step can be performed with an desired number of masks. For example, critical wiring such as source, drain and gate contacts as well as fixed metal connections could be generated by a first fixed metalization mask.

Figure 9:
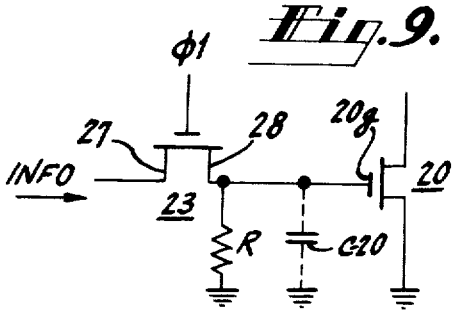
FIG. 9 is a schematic circuit diagram illustrating the leakage path in a dynamic logic application.

A further aspect of the invention extends the lower limits of the clock frequency range for dynamic logic applications. Referring first to FIG. 9, there is illustrated the basic hardware mechanism for MOS dynamic logic applications. The information identified as INFO is applied to the source-drain 27 of a transmission gate device 23. The clock signal $\phi$1 turns the transmission gate 23 on to gate the INFO by way of its conduction path to an inverter P–MOS device 20. During the time intervals when the clock signal $\phi$1 is not applied, the INFO is stored on the gate capacitance C–20 which is associated with the gate 20g. The storage time constant in a P-MOS LSI array is a function of the leakage of the P-N junction formed by the source-drain region 28 of the device 23 and the N-type substrate. This leakage is represented by the dashed connection of a resistor R between the source-drain 28 and circuit ground. In general the larger the surface area of the P-N junction, the smaller the resistance R and the shorter the storage time constant. Consequently, it is preferable for all connections from the output of a transmission gate device to the gate of an inverter device to be by way of a metal connector rather than a diffused region connector.

Figure 10:
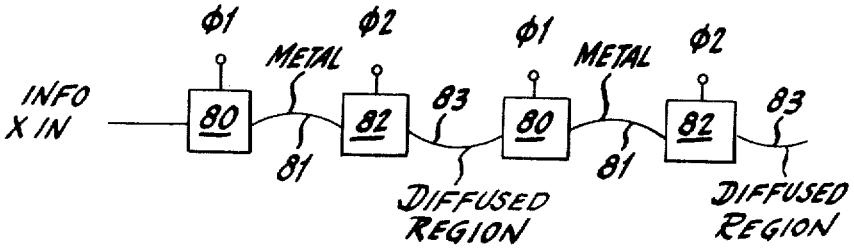
FIG. 10 is a block diagram of a dynamic logic application illustrating a further aspect of the invention.
Figure 11:
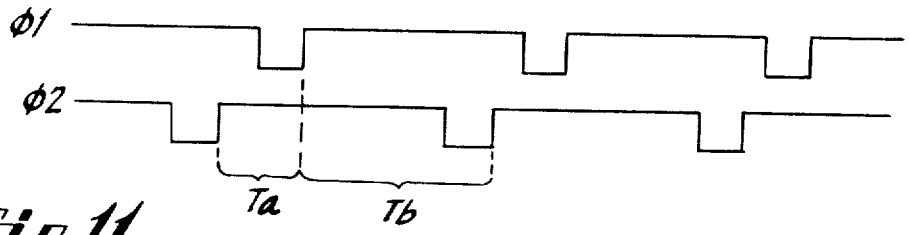
FIG. 11 is a timing diagram for the dynamic logic configuration of FIG. 10.

However, in an LSI array it is not always possible to use metal connectors, as interconnect crossovers may be required. The feature of the invention shown in FIG. 10 with timing diagrams shown in FIG. 11 extends the minimum clock frequency by using all metal connectors from the first clock phase stage to a second clock phase stage; while using diffused region connectors, when necessary, only from second clock phase stages to first clock phase stages. In addition, the time between the end of the second clock phase and the end of the first clock phase is minimized. As illustrated in FIGS. 10 and 11, by way of example, the outputs of the clock phase $\phi$1 stages 80 are connected by way of metal connectors 81 to the inputs of clock phase $\phi$2 stages 82; and the outputs of the $\phi$2 stages 82 are connected to the inputs of the $\phi$1 stages 80 by way of diffused regions 93.

In FIG. 11, the time Ta between the end of the $\phi$2 clock pulse and the end of the $\phi$1 clock pulse is minimized in accordance with the storage time constant of the gate capacitance C–20 and the leakage resistance R is a diffused region connector. On the other hand, the time Tb between the end of the $\phi$1 clock pulse and the end of the $\phi$2 clock pulse may be relatively longer (due to the higher leakage resistance). Consequently, the metal connectors 81 (low leakage points) essentially determine the minimum clock frequency.

Although the invention has been illustrated with only one type of standard cell in the LSI array, it should be noted that the array may include other types of standard cells. For example, the array may include some rows of the FIG. 1 standard cells and other rows of different standard cells.

What is claimed is:

1. An LSI array of standard cells sharing a common substrate, each standard cell comprising:

first, second, third and fourth insulated gate field effect devices each having a gate region insulated from a channel defined by source and drain regions, the transconductances (gm) of the first and second devices being relatively large, the (gm) of the third device being relatively small, and the (gm) of the fourth device being of intermediate value; a plurality of unconditional connection points; the channels of the first and second devices sharing one of the unconditional points and the channels of the third and fourth devices sharing another of the unconditional connection points; conditional connection points associated with each of the unconditional points, with each of the gate regions and with selected ones of the remaining source and drain regions.

2. The invention according to claim 1 wherein the substrate is of a first conductivity semiconductor material and the source and drain regions are defined by regions of second conductivity semiconductor material diffused in one surface of the substrate; and wherein a layer of insulating material overlies said one surface and has access apertures positioned over said regions.

3. The invention according to claim 2 wherein a functional connection pattern is provided for electrically connecting the conditional points of the cells to provide functional identity for one or more cells or portions thereof.

4. The invention according to claim 3 wherein the first and second field effect devices are defined by first, second and third regions of second conductivity material arranged in spaced apart relation in said one surface of the substrate to provide first and second channels of relatively large width w to length l(w/l) ratios with the second region being common to the first and second channels and representing said one unconditional connection point;

wherein the third and fourth field effect devices are defined by fourth, fifth and sixth regions of second conductivity material arranged in spaced apart relation in said substrate surface to provide a third channel of relatively small w/l ratios and a fourth channel of intermediate w/l ratios with the fifth region being common to the third and fourth channels and representing said other unconditional connection point;

wherein the portions of the insulating layer overlying the first, second, third and fourth channels provide the first, second, third and fourth gate regions, respectively; and wherein the functional connection pattern includes a metallization pattern overlying said insulating layer and extending through said access apertures to electrically connect the conditional points of the cells.

5. The invention according to claim 4 wherein the functional connection pattern further includes a plurality of connector regions of second conductivity type material arranged in said one substrate surface; and wherein the insulating layer has further access apertures positioned over the connector regions.

6. An LSI array of standard cells arranged in coordinate rows and columns with runways positioned between each row; said standard cells each including a plurality of *field-effect devices; said devices including* first conductivity type semiconductor regions diffused in one surface of a second conductivity type semiconductor substrate, *said regions of first conductivity type being* [in] spaced apart [relation] to form *therebetween* plural conduction [paths] *channels*; and insulating layer overlying said one surface and having access apertures therethrough positioned above said regions; wherein the improvement comprises:

at least one region of first semiconductor material extending under one of said runways and being *electrically and physically* common to a conduction

[path] *channel* in each of a pair of adjacent cells in a column.

7. A multi-phase clocked LSI array including a plurality of stages clocked at a first phase $\phi 1$ and another plurality of stages clocked at a second phase $\phi 2$ wherein the information is temporarily stored at the input of each stage in between the clock pulses, a multi-layer connector pattern for the LSI array including a first layer of connector regions of a first conductivity semiconductor material diffused in one surface of a substrate of second conductivity semiconductor material and a second layer of metal connectors insulated from the first layer diffused region connectors in supportable relation to said substrate, wherein the improvement comprises:

the $\phi 1$ stages being coupled to the $\phi 2$ stages by way of second layer metal connectors only and the $\phi 1$ stages being connected to the $\phi 2$ stages by way of either the second layer metal connectors or the first layer diffused region connectors; and clock generator means for generating the $\phi 1$ and $\phi 2$ clock pulses with the intervals between the trailing edges of the $\phi 2$ pulses and the trailing edges of the $\phi 1$ pulses being minimized in accordance with the leakage of the diffused region connectors, whereby the minimum clock frequency is determined by the intervals between the trailing edges of the $\phi 1$ pulses and the trailing edges of the $\phi 2$ pulses.

8. An LSI array of cells supported by a substrate and arranged in rows and columns with runways positioned between the rows, a multi-layer connector pattern supported by the substrate and including a first connector layer overlying a second connector layer with an insulator layer therebetween; wherein the improvement comprises:

a supply line included in said first layer [and] arranged to *extend for substantially the full length of each runway and to* wind along the runways in a serpentine fashion *for contacting all the cells of said array.*

9. The invention according claim 8 wherein said supply line extends along the runways located between the rows of adjacent pairs of rows.

10. The invention according to claim 9 wherein said supply line is one of plural lines included in a bus structure which winds along the runways in a serpentine fashion.

*11. The combination as claimed in claim 6 wherein a pair of spaced apart first conductivity type regions form the source and drain region of a field-effect transistor; and wherein said region extending under one of said runways is common to one of said source and drain region is each of a pair of cells on either side of said runway.*

*12. The combination as claimed in claim 11 further including a metal electrode insulated from said one surface overlying said conduction channel region for controlling the conductivity of said conduction channel.*

References Cited

The following references, cited by the Examiner, are of record in the patented file of this patent or the original patent.

UNITED STATES PATENTS 3,218,013 11/1965 Gribble et al. ..... 340—173

TERRELL W. FEARS, Primary Examiner

U.S. Cl. X.R.

307—238, 279

UNITED STATES PATENT OFFICE
CERTIFICATE OF CORRECTION

Patent No. RE 27,935 Dated March 5, 1974

Inventor(s) Thomas Richard Mayhew

It is certified that error appears in the above-identified patent and that said Letters Patent are hereby corrected as shown below:

Col. 1, line 28, after "637,413" insert ---now patent number 3,500,062 ---. Col. 1, line 34, after "439" insert --- now abandoned ---. Col. 2, line 7, change "areas" to --- area ---. Col. 2, line 59, change "component" to --- components ---. Col. 2, line 61, change "each" to --- such ---. Col. 3, line 27, change "shaded" to --- shared ---. Col. 4, line 56, change "designed" to --- designated ---. Col. 4, line 68, change "fied" to --- tified ---. Col. 4, line 72, change "regionis" to --- region ---. Col. 6, line 16, change "or" to --- as ---. Col. 6, line 45, change "cells" to --- cell ---. Col. 7 line 57, delete the entire line and insert therefor --- row. Overlying the runways 70-2, 70-4 and 70-6 is a ---. Col. 10, line 4, change "an" to --- any ---. Col. 10, line 46, change "93" to --- 83 ---. Col. 11, line 64, change "and" to --- an ---. Col. 12, line 52, change "is" to --- in ---.

Signed and sealed this 3rd day of December 1974.

(SEAL)
Attest:

McCOY M. GIBSON JR.
Attesting Officer

C. MARSHALL DANN
Commissioner of Patents